(12) United States Patent
Ishikawa et al.

(10) Patent No.: US 7,481,412 B2
(45) Date of Patent: Jan. 27, 2009

(54) SOLENOID-OPERATED CUTOFF VALVE FOR USE WITH FUEL CELLS

(75) Inventors: Kazuki Ishikawa, Utsunomiya (JP); Yoshio Saito, Iwanuma (JP); Toshiaki Kamo, Iwanuma (JP); Katsumi Sahoda, Tsurugashima (JP); Osamu Ichikawa, Takasaki (JP); Kouji Miyano, Utsunomiya (JP); Tatsuya Sugawara, Kawachi-gun (JP)

(73) Assignee: Keihin Corporation, Tokyo (JP)

( * ) Notice: Subject to any disclaimer, the term of this patent is extended or adjusted under 35 U.S.C. 154(b) by 0 days.

(21) Appl. No.: 11/292,047

(22) Filed: Nov. 30, 2005

(65) Prior Publication Data

US 2006/0163513 A1    Jul. 27, 2006

(30) Foreign Application Priority Data

Nov. 30, 2004  (JP) .............................. 2004-347869
Nov. 30, 2004  (JP) .............................. 2004-347877

(51) Int. Cl.
*F16K 31/12* (2006.01)

(52) U.S. Cl. .................................. 251/30.04; 251/368

(58) Field of Classification Search .............. 251/30.03, 251/30.04, 368, 129.02, 129.15, 129.17
See application file for complete search history.

(56) References Cited

U.S. PATENT DOCUMENTS

| | | | | |
|---|---|---|---|---|
| 3,059,892 A | * | 10/1962 | Windsor ................. | 251/30.03 |
| 3,791,619 A | * | 2/1974 | Pett ........................ | 251/30.02 |
| 4,717,116 A | * | 1/1988 | Ishigaki ................... | 251/30.02 |
| 4,860,990 A | * | 8/1989 | Fukuzawa et al. ........ | 251/30.03 |
| 5,244,179 A | * | 9/1993 | Wilson .................... | 251/30.03 |
| 5,294,089 A | * | 3/1994 | LaMarca ................. | 251/30.02 |
| 5,599,003 A | * | 2/1997 | Seemann et al. ......... | 251/30.03 |
| 6,076,550 A | * | 6/2000 | Hiraishi et al. ........... | 251/30.03 |
| 6,145,322 A | * | 11/2000 | Odashima ................ | 251/149.6 |
| 6,367,506 B1 | * | 4/2002 | Takagi et al. ............. | 251/30.04 |
| 6,457,697 B1 | * | 10/2002 | Kolze ...................... | 251/30.03 |
| 6,619,612 B2 | * | 9/2003 | Freisinger et al. ........ | 251/30.03 |

FOREIGN PATENT DOCUMENTS

JP    2004-185831    7/2004

* cited by examiner

*Primary Examiner*—John Bastianelli
(74) *Attorney, Agent, or Firm*—Lahive & Cockfield, LLP; Anthony A. Laurentano, Esq.

(57) ABSTRACT

A solenoid-operated cutoff valve for use with fuel cells has a movable member disposed in a guide housing for displacement upon energization of a solenoid. When the movable member is displaced, a pilot valve is unseated from a pilot valve seat. A fluid in a communication chamber flows through a pilot passage into an output port. The communication chamber is divided into a first communication chamber and a second communication chamber by a diaphragm. Under a pressure difference developed between the first communication chamber and the second communication chamber, a main valve of a valve head is unseated from a valve seat of a valve housing, opening the solenoid-operated cutoff valve.

11 Claims, 6 Drawing Sheets

SOLENOID-OPERATED CUTOFF VALVE FOR USE WITH FUEL CELLS

BACKGROUND OF THE INVENTION

1. Field of the Invention

The present invention relates to a solenoid-operated cutoff valve for selectively passing a reaction gas through a communication chamber upon energization of a solenoid in a fuel cell system.

2. Description of the Related Art

The KEIHIN CORPORATION has proposed a regulator unit for use with fuel cells which is connected to a fluid passage and includes a cutoff valve for selectively passing a fluid such as a fuel gas or the like through the fluid passage upon energization of a solenoid (see Japanese Laid-Open Patent Publication No. 2004-185831).

The cutoff valve has a stationary iron core fixed to a housing and a plunger disposed coaxially with the stationary iron core for displacement toward the stationary iron core in response to energization of the solenoid. A valve head is coupled to an end of the plunger, and is seated on a valve seat in the housing under the resiliency of a spring, thereby closing the cutoff valve. The valve head comprises a first valve seatable on a first valve seat in the housing and a second valve displaceably supported on the lower end of the plunger. The second valve is crimped on the plunger by a substantially c-shaped clip, thereby holding the valve head on the lower end of the plunger.

When the second valve is unseated from a second valve seat disposed in the plunger, a fluid flows through the second valve into a port, reducing the pressure of the fluid in a valve chamber in which the second valve is disposed. The reduction in the pressure of the fluid causes the first valve to be unseated from the first valve seat, allowing a larger amount of fluid to flow through the valve seat into the port.

SUMMARY OF THE INVENTION

It is a general object of the present invention to provide a solenoid-operated cutoff valve for use with fuel cells which is capable of displacing a valve head with an improved response.

The above and other objects, features, and advantages of the present invention will become more apparent from the following description when taken in conjunction with the accompanying drawings in which preferred embodiment of the present inventions are shown by way of illustrative example.

DESCRIPTION OF THE PREFERRED EMBODIMENTS

Figure 1:
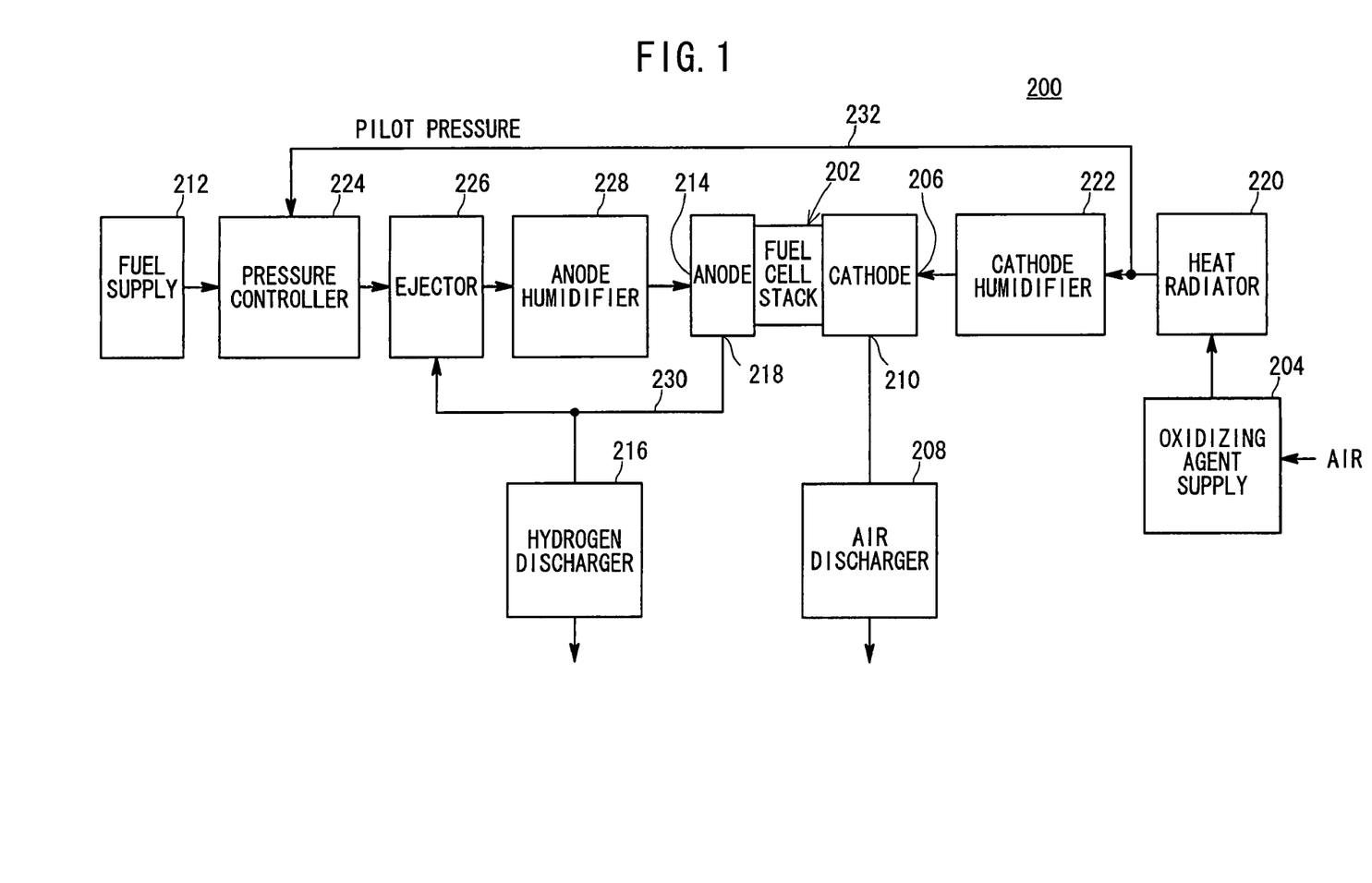
FIG. 1 is a block diagram of a fuel cell system which incorporates a solenoid-operated cutoff valve for fuel cells according to an embodiment of the present invention.

FIG. 1 is a block diagram of a fuel cell system 200 which incorporates a solenoid-operated cutoff valve for use with fuel cells according to an embodiment of the present invention. The fuel cell system 200 is mounted on a vehicle such as an automobile or the like.

As shown in FIG. 1, the fuel cell system 200 includes a fuel cell stack 202 having a stack of cells each comprising a solid polymer electrolyte membrane, such as a polymer ion exchange membrane or the like, sandwiched between an anode and a cathode that are disposed one on each side of the polymer electrolyte membrane. The fuel cell stack 202 has anodes for being supplied with hydrogen, for example, as a fuel and cathodes for being supplied with air containing oxygen, for example, as an oxidizing agent. A reaction gas used in the present embodiment collectively refers to hydrogen, air, and excessive gas.

The cathode has an air supply port 206 for being supplied with air from an oxidizing agent supply 204 and an air discharge port 210 connected to an air discharger 208 for discharging air in the cathode. The anode has a hydrogen supply port 214 for being supplied with hydrogen from a fuel supply 212 and a hydrogen discharge port 218 connected to a hydrogen discharger 216.

In the fuel cell stack 202, hydrogen ions that are generated at the anode by a catalytic reaction move through the solid polymer electrolyte membrane to the cathode where the hydrogen ions and oxygen cause an electrochemical reaction to generate electric power.

To the air supply port 206, there are connected the oxidizing agent supply 204, a heat radiator 220, and a cathode humidifier 222 through an air supply passage. The air discharger 208 is connected to the air discharge port 210 through an air discharge passage.

To the hydrogen supply port 214, there are connected the fuel supply 212, a pressure controller 224, an ejector 226, and an anode humidifier 228 by a hydrogen supply passage. The hydrogen discharger 216 is connected to the hydrogen discharge port 218 by a circulation passage 230.

The oxidizing agent supply 204 comprises, for example, an air compressor and a motor for actuating the air compressor (not shown). The oxidizing agent supply 204 adiabatically compresses air, which is to be used as an oxidizing gas in the fuel cell stack 202, and delivers the compressed air to the fuel cell stack 202. When the air is adiabatically compressed, it is heated. The heated air is effective to warm the fuel cell stack 202.

The air supplied from the oxidizing agent supply 204 is introduced into the fuel cell stack 202 under a preset pressure depending on a load on the fuel cell stack 202, a degree of an accelerator pedal (not shown) pressed, or the like. After the air supplied from the oxidizing agent supply 204 is cooled by the heat radiator 220, a portion of the air is supplied as a pilot pressure through a bypass passage 232 to the pressure controller 224.

The heat radiator 220 comprises an intercooler or the like (not shown), for example. The air supplied from the oxidizing agent supply 204 is cooled by a heat exchange with cooling water which flows through a flow passage while the fuel cell stack 202 is in normal operation. Therefore, the air is cooled to a predetermined temperature and then introduced into the cathode humidifier 222.

The cathode humidifier 222 has a water-permeable membrane, for example. The cathode humidifier 222 humidifies the air, which has been cooled to the predetermined temperature by the heat radiator 220, to a certain humidity by passing water from one side of the water-permeable membrane to the other, and supplies the humidified air to the air supply port 206 of the fuel cell stack 202. The humidified air is supplied to the fuel cell stack 202 to keep the ion conductivity of the solid polymer electrolyte membranes in the fuel cell stack 202 at a certain level. The air discharger 208 is connected to the air discharge port 210 of the fuel cells stack 202.

The fuel supply 212 comprises a hydrogen gas container (not shown) for supplying hydrogen as a fuel to the fuel cells, for example. The fuel supply 212 stores hydrogen that is to be supplied to the anode of the fuel cell stack 202.

The pressure controller 224 comprises a pneumatic proportional pressure control valve, for example. Using the pressure of air from the bypass passage 232 as a pilot pressure (pilot signal pressure), the pressure controller 224 sets a secondary pressure as its outlet pressure to a pressure in a predetermined range corresponding to the pilot pressure.

The ejector 226 comprises a nozzle and a diffuser (not shown). The fuel (hydrogen) supplied from the pressure controller 224 is accelerated when it passes through the nozzle, and ejected toward the diffuser. When the fuel flows at a high speed from the nozzle to the diffuser, a negative pressure is developed in an auxiliary chamber disposed between the nozzle and the diffuser, attracting the fuel discharged from the anode through the circulation passage 230. The fuel and the discharged fuel that are mixed together by the ejector 226 are supplied to the anode humidifier 228. The fuel discharged from the fuel cell stack 202 circulates through the ejector 226.

Therefore, the unreacted gas discharged from the hydrogen discharge port 218 of the fuel cell stack 202 is introduced through the circulation passage 230 into the ejector 226. The hydrogen supplied from the pressure controller 224 and the gas discharged from the fuel cell stack 202 are mixed with each other and supplied again to the fuel cell stack 202.

The anode humidifier 228 has a water-permeable membrane, for example. The anode humidifier 228 humidifies the fuel, which has been delivered from the ejector 226, to a certain humidity by passing water from one side of the water-permeable membrane to the other, and supplies the humidified fuel to the hydrogen supply port 214 of the fuel cell stack 202. The humidified hydrogen is supplied to the fuel cell stack 202 to keep the ion conductivity of the solid polymer electrolyte membranes of the fuel cell stack 202 at a certain level.

The hydrogen discharger 216 which has a discharge control valve, not shown, is connected to the hydrogen discharge port 218 of the fuel cell stack 202 by the circulation passage 230. The discharge control valve can be opened and closed depending on an operating state of the fuel cell stack 202 for discharging, out of the vehicle, excessive water (mainly liquid water) in a discharged gas which has been separated by a reservoir tank, not shown.

FIGS. 2 through 6 show the solenoid-operated cutoff valve, denoted by 10, for use with fuel cells according to the embodiment of the present invention. The solenoid-operated cutoff valve 10 is disposed between the fuel supply 212 and the pressure controller 224 of the fuel cell system 200.

Figure 2:
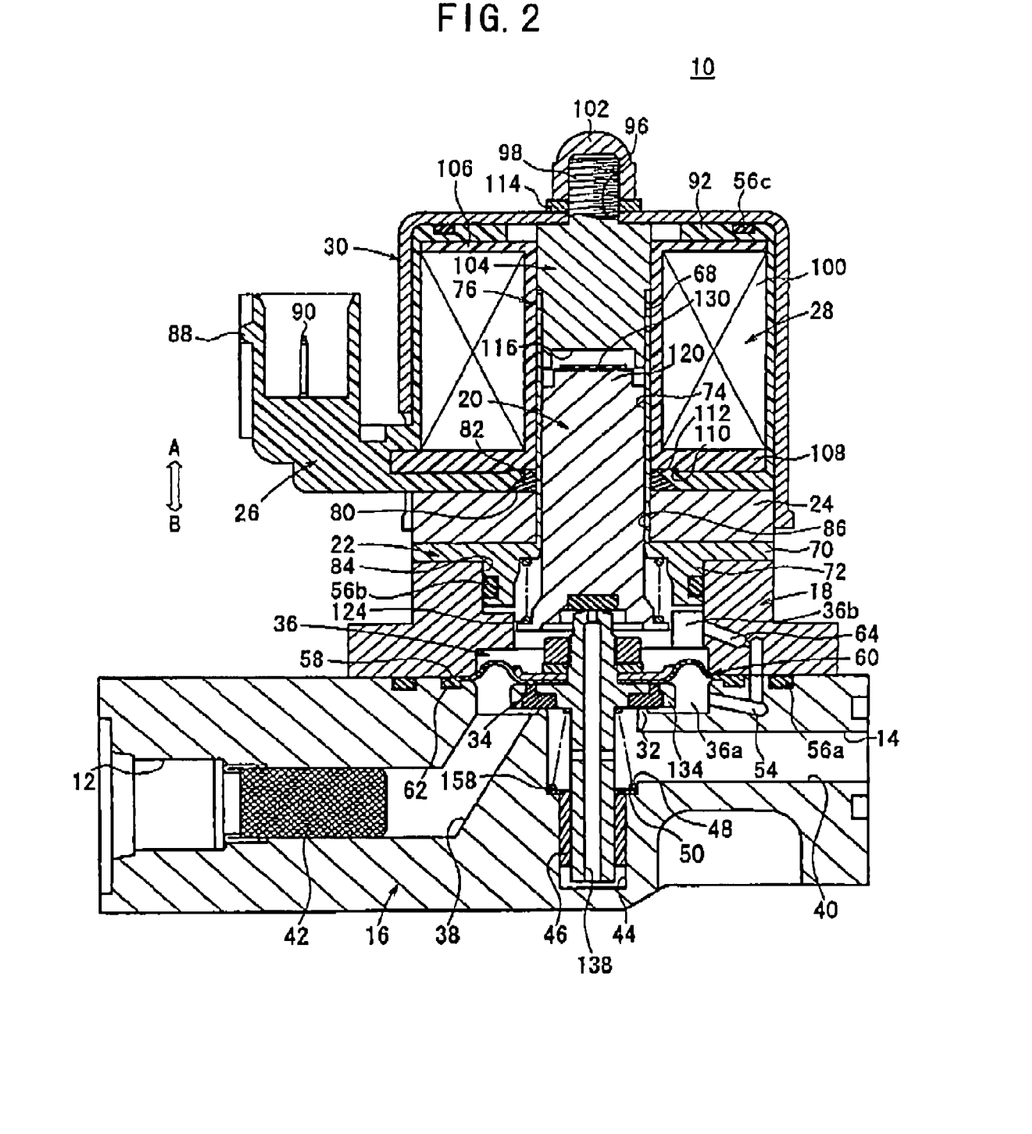
FIG. 2 is a vertical cross-sectional view of the solenoid-operated cutoff valve according to the embodiment of the present invention.
Figure 3:
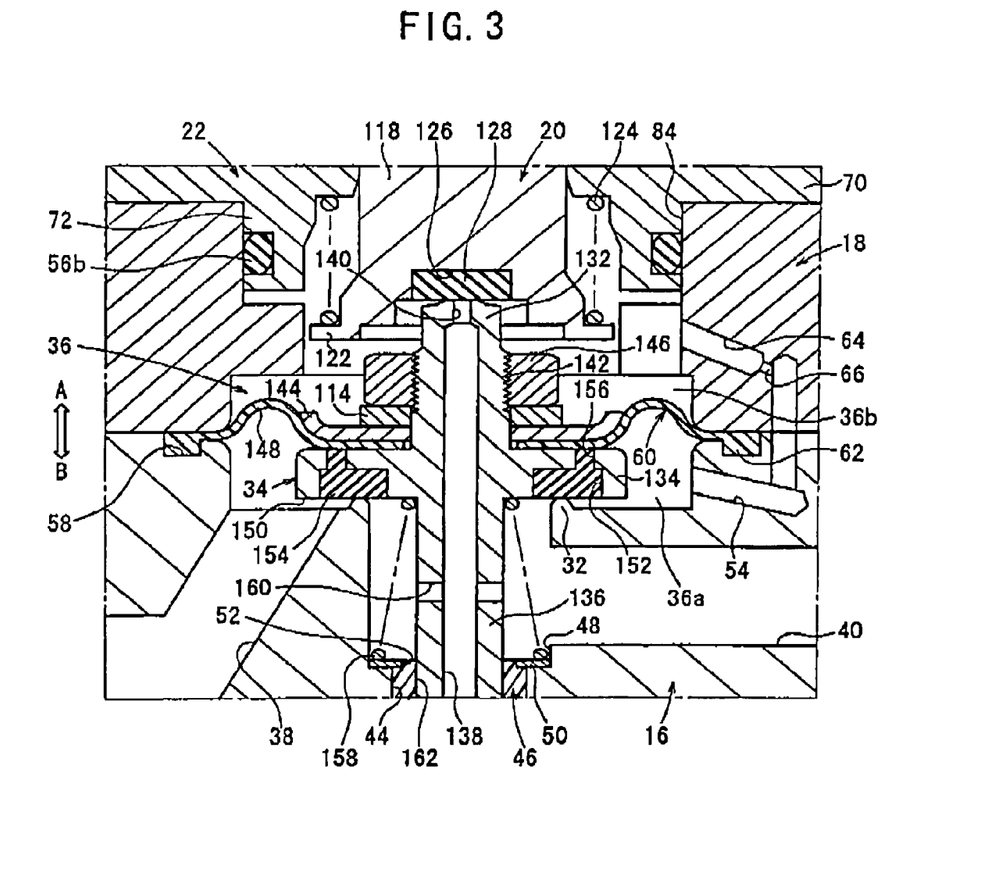
FIG. 3 is an enlarged fragmentary vertical cross-sectional view of a valve head and surrounding parts of the solenoid-operated cutoff valve shown in FIG. 2.

As shown in FIGS. 2 and 3, the solenoid-operated cutoff valve 10 (hereinafter referred to as "cutoff valve 10") has a valve housing (first housing) 16 for being supplied with and discharging supplied hydrogen (hereinafter referred to as "fluid") through an inlet port 12 and an outlet port 14. The cutoff valve 10 also has an auxiliary housing (second housing) 18 mounted on an upper surface of the valve housing 16. A guide housing 22 having a displaceable movable member 20 disposed therein is mounted on an upper surface of the auxiliary housing 18.

The cutoff valve 10 further includes a solenoid housing 26 mounted on an upper surface of the guide housing 22 with an end plate 24 interposed therebetween, a solenoid 28 disposed in the solenoid housing 26, a cover member 30 mounted to cover external surfaces of the solenoid housing 26, and a valve head 34 for selectively passing the fluid by being seated on and unseated from a valve seat (second valve seat) 32 of the valve housing 16.

The valve housing 16 is made of a metallic material, e.g., aluminum, and has the inlet port 12 which is open at a side surface thereof and the outlet port 14 which is open at an opposite side surface thereof remotely from the inlet port 12. The valve housing 16 also has a communication chamber 36 defined therein which extends into the auxiliary housing 18. The valve head 34 is axially displaceably disposed in the communication chamber 36. The valve housing 16 has a first passage 38 defined therein which extends between the communication chamber 36 and the inlet port 12, and a second passage 40 defined therein which extends between the communication chamber 36 and the outlet port 14. The valve seat 32 for seating the valve head 34 thereon is in the form of an annular seat projecting upwardly from an upper surface of the valve housing 16 toward the valve head 34. The valve seat 32 defines an inner space therein which communicates with the second passage 40.

A joint (not shown) connected to a pipe or the like is joined to the inlet port 12. The pipe or the like is held in communication with the inlet port 12 through a passage in the joint.

The first passage 38 extends by a predetermined distance substantially horizontally from the inlet port 12 toward the center of the valve housing 16, and then extends obliquely upwardly at a predetermined angle and is connected to a lower end of the communication chamber 36. A filter (removing member) 42 having a substantially U-shaped cross section which is open toward the inlet port 12 is mounted in the first passage 38. The filter 42 has its bottomed end directed toward the communication chamber 36.

When the fluid is introduced from the inlet port 12, dust particles and foreign matter contained in the fluid are removed by the filter 42 having a plurality of fine pores and prevented from entering the communication chamber 36.

Specifically, the fine pores of the filter 42 have a pore size smaller than the diameter of the passage defined in an orifice (restriction) 66 (see FIGS. 3 through 6), to be described later, defined in the auxiliary housing 18. Since the filter 42 removes dust particles and foreign matter that are greater in size than the diameter of the passage defined in the orifice 66, the orifice 66 is prevented from being clogged by those dust particles and foreign matter. Consequently, the fluid introduced from the inlet port 12 can reliably and stably flow through the orifice 66 into the communication chamber 36.

The second passage 40 extends a predetermined distance vertically downwardly from the valve seat 32 into the valve housing 16, and then extends radially outwardly into communication with the outlet port 14. The vertically downwardly extending portion of the second passage 40 has a mount hole 44 in its lower portion which is smaller in diameter than the second passage 40. A tubular guide sleeve 46 is lightly press-fitted or fitted in the mount hole 44. The guide sleeve 46 is made of fluorine resin, e.g., Teflon®.

A ring-shaped flat washer (engaging member) 50 is mounted on a step 48 in the boundary between the second passage 40 and the mount hole 44. The guide sleeve 46 has an end engaging in a hole 52 defined centrally in the flat washer 50 and engaging a portion of a lower end face of the flat washer 50. The guide sleeve 46 is prevented from being axially displaced in the mount hole 44 by the flat washer 50, and hence from being dislodged out of the mount hole 44. The flat washer 50 serves as a seat for a valve spring (first spring) 158, to be described later, and a stop for preventing the guide sleeve 46 from being dislodged out of the mount hole 44.

The valve housing 16 has a first communication passage 54 defined therein near the outlet port 14 and providing fluid communication with the communication chamber 36. The first communication passage 54 extends obliquely downwardly from an inner side surface of the communication chamber 36, and then extends vertically upwardly. Specifically, the communication chamber 36 comprises a first communication chamber 36a defined in the valve housing 16 and a second communication chamber 36b defined in the auxiliary housing 18. The first communication passage 54 has an end connected to the first communication chamber 36a and an opposite end connected to a second communication passage 64 that is defined in the auxiliary housing 18 in communication with the second communication chamber 36b. The first communication passage 54 is positioned near the outlet port 14 remotely from the inlet port 12 in the valve housing 16.

The valve housing 16 has an annular groove defined in an upper end face thereof which faces the auxiliary housing 18, and an O-ring (seal) 56a is mounted in the annular groove. The O-ring 56a keeps the communication chamber 36 hermetically sealed when the valve housing 16 and the auxiliary housing 18 are connected to each other.

The valve housing 16 also has an annular recess 58 defined in the upper end face thereof at a position that is spaced radially inwardly from the annular groove which receives the O-ring 56a therein. A diaphragm (flexible member) 60, to be described later, has an enlarged outer peripheral edge 62 mounted in the annular recess 58 and clamped between the annular recess 58 and a lower end face of the auxiliary housing 18 which faces the valve housing 16.

Since the O-ring 56a is positioned radially outwardly of the recess 58 which receives the enlarged outer peripheral edge 62 of the diaphragm 60, both the O-ring 56a and the enlarged outer peripheral edge 62 of the diaphragm 60 are effective to keep the communication chamber 36 hermetically sealed. Accordingly, the fluid is reliably prevented from leaking out from between the valve housing 16 and the auxiliary housing 18.

Specifically, when the enlarged outer peripheral edge 62 of the diaphragm 60 is mounted in the recess 58, the upper surface of the enlarged outer peripheral edge 62 lies substantially flush with the end face of the valve housing 16. The enlarged outer peripheral edge 62 and the O-ring 56a that is positioned radially outwardly of the enlarged outer peripheral edge 62 provide a double-seal structure for a greater sealing capability than if only the enlarged outer peripheral edge 62 is provided in abutment against the lower end face of the auxiliary housing 18. Consequently, the communication chamber 36 is reliably hermetically sealed.

The first communication passage 54 includes a substantially vertical portion extending from the valve housing 16 upwardly into the auxiliary housing 18 in a region between the recess 58 and the O-ring 56a (see FIG. 2). Even if the fluid flowing through the first communication passage 54 leaks into the boundary between the valve housing 16 and the auxiliary housing 18, the fluid is prevented from leaking further outwardly by the enlarged outer peripheral edge 62 fitted in the recess 58 and the O-ring 56a.

The auxiliary housing 18 is of a substantially hollow cylindrical shape and is integrally fastened to the upper end face of the valve housing 16 by bolts (not shown).

The second communication passage 64 is defined in the auxiliary housing 18 in communication with the communication chamber 36 and extends radially outwardly. The second communication passage 64 communicates with the first communication passage 54 in the valve housing 16. An orifice 66 having a diameter smaller than the first and second communication passages 54, 64 is defined in the auxiliary housing 18 between the first and second communication passages 54, 64. Therefore, the first and second communication passages 54, 64 communicate with each other through the orifice 66.

The diameter of the passage in the orifice 66 may be changed to control highly accurately the rate of the fluid that flows from the first communication chamber 36a through the orifice 66 into the second communication chamber 36b.

The first and second communication passages 54, 64 and the orifice 66 should preferably be positioned remotely from the inlet port 12. It is the most suitable to position the first and second communication passages 54, 64 and the orifice 66 in a region that is spaced most widely from the inlet port 12. For example, the first and second communication passages 54, 64 and the orifice 66 should preferably be positioned in the valve housing 16 and the auxiliary housing 18 closely to the outlet port 14. With the first and second communication passages 54, 64 and the orifice 66 being thus positioned, the rate of the fluid flowing therethrough does not become unstable due to the speed of the fluid that is introduced from the inlet port 12, and the fluid can be supplied through the first and second communication passages 54, 64 and the orifice 66 to the second communication chamber 36b stably at a desired rate, making the fluid pressure stable in the second communication chamber 36b.

The guide housing 22 is made of a metallic material such as stainless steel or the like, and is mounted on the upper surface of the auxiliary housing 18. The guide housing 22 includes a relatively long guide sleeve 68 axially extending upwardly from an upper surface of the guide housing 22, a flange 70 extending radially outwardly from the lower end of the guide sleeve 68 and mounted on an upper end face of the auxiliary housing 18, and an insert 72 extending downwardly from the flange 70 and inserted into the auxiliary housing 18.

The guide sleeve 68 comprises a thin-walled hollow cylinder having a support hole 74 defined therein. The movable member 20 is axially displaceably supported in the support hole 74. The guide sleeve 68 is inserted in an insertion hole defined in a bobbin 76, to be described later, and a through hole 86, to be described later, defined in the end plate 24. The guide sleeve 68 has an upper end secured to a fixing member 104, to be described later, by laser beam welding or the like, for example.

An annular seal 82 is mounted in a space surrounded by an outer circumferential surface of the guide sleeve 68, an insertion hole 80 defined in the solenoid housing 26 in which the guide sleeve 68 is inserted, and an upper surface of the end plate 24. The annular seal 82 hermetically seals the interior of the solenoid 28.

The insert 72 is slightly greater in diameter than the guide sleeve 68 and is fixedly inserted in an insertion hole 84 defined in the auxiliary housing 18. The insert 72 has an annular groove defined in an outer circumferential surface thereof and receiving an O-ring 56*b* mounted therein. The O-ring 56*b* is held against an inner wall surface of the auxiliary housing 18 to keep the boundary between the guide housing 22 and the auxiliary housing 18 hermetically sealed.

The end plate 24 is made of a magnetic metallic material and has an annular shape. The end plate 24 is joined to an upper surface of the flange 70 of the guide housing 22. The through hole 86 is defined substantially centrally in the end plate 24, and the guide sleeve 68 of the guide housing 22 is inserted through the through hole 86.

The solenoid housing 26 is integrally molded of a resin material, and is joined to the upper surface of the end plate 24. A connector 88 for being electrically connected to a power supply, not shown, for supplying an electric current to the solenoid 28 is mounted on a side surface of the solenoid housing 26. The connector 88 has a terminal 90 of metal disposed therein and having an exposed end portion. The terminal 90 is electrically connected to the bobbin 76 of the solenoid 28 through the solenoid housing 26. The terminal 90 is electrically connected to the power supply through leads, not shown.

The solenoid housing 26 includes a flange 92 projecting radially inwardly from an upper end thereof. The flange 92 has an annular groove defined in an upper end face thereof and accommodating an O-ring 56*c* therein. The O-ring 56*c* is held between the solenoid housing 26 and a cover member 30, to be described later, and hermetically seals the gap between the solenoid housing 26 and the cover member 30.

The cover member 30 is made of a magnetic metallic material and has a substantially inverted u-shaped cross section. The cover member 30 is mounted in covering relation to the solenoid housing 26 and the end plate 24. The end plate 24 is prevented by the cover member 30 from being dislodged from between the guide housing 22 and the solenoid housing 26. The cover member 30 has a hole 96 defined substantially centrally in an upper end thereof. The fixing member 104 has an externally threaded knob 98 projecting upwardly from its upper end face and inserted through the hole 96.

The solenoid 28 comprises a bobbin 76 disposed in and surrounded by the solenoid housing 26, a coil 100 wound around the bobbin 76, the movable member 20 axially displaceably disposed in the bobbin 76, and the fixing member 104 coupled to the upper end of the solenoid housing 26 by a cap nut 102 threaded over the externally threaded knob 98 and disposed in axially confronting relation to the movable member 20.

The bobbin 76 is disposed in abutment against the inner circumferential surface of the solenoid housing 26. The bobbin 76 has a first large-diameter flange 106 and a second large-diameter flange 108 disposed respectively on upper and lower ends thereof and extending radially outwardly. The coil 100 is wound around the bobbin 76 axially between the first large-diameter flange 106 and the second large-diameter flange 108. The bobbin 76 is integrally molded with the solenoid housing 26.

The first large-diameter flange 106 is held against a lower surface of the flange 92 of the solenoid housing 26, and the second large-diameter flange 108 has an annular groove 110 defined in a lower surface thereof and receiving an annular protrusion 112 disposed on an upper end face of the solenoid housing 26. Therefore, the bobbin 76 with the coil 100 wound thereon engages in the solenoid housing 26, and is surrounded in its entirety by the solenoid housing 26.

The fixing member 104, which is made of a magnetic metallic material, is inserted in the bobbin 76. The movable member 20 is disposed axially beneath the fixing member 104 within the guide sleeve 68 of the guide housing 22.

For assembling the cover member 30, the externally threaded knob 98 of the fixing member 104 is inserted into the hole 96 in the cover member 30, a washer 114 is placed around the externally threaded knob 98, and then the cap nut 102 is threaded over the externally threaded knob 98 to fasten the fixing member 104 to the solenoid housing 26.

The fixing member 104 has a recess 116 defined in a lower end face thereof and having a predetermined depth in a direction away from the movable member 20.

The movable member 20 is made of a magnetic metallic material. The movable member 20 includes a substantially cylindrical main body 118 that is displaceable axially in the guide sleeve 68 and a land 120 projecting from an upper end of the main body 118 toward the fixing member 104.

The main body 118 has a spring retainer 122 projecting radially outwardly from the lower end thereof. A return spring (second spring) 124 is interposed between the spring retainer 122 and the guide housing 22. The return spring 124 biases the movable member 20 to be displaced toward the valve seat 32 of the valve housing 16, i.e., in the direction indicated by the arrow b (see FIG. 3).

A pilot valve seat (first valve seat) 128 is mounted in a cavity 126 having a predetermined depth which is defined substantially centrally in a lower end portion of the main body 118 in facing relation to the valve seat 32. The pilot valve seat 128 is made of an elastic material such as rubber or the like, and is disposed in a position that is spaced upwardly from a lower end face of the movable member 20 toward the fixing member 104, i.e., in the direction indicated by the arrow a. The elastic pilot valve seat 128 has a seating function to close a pilot port (passage) 140 when a pilot valve (first valve) 132 is seated on the pilot valve seat 128 and a silencing function to prevent contact noise from being produced when pilot valve 132, which is made of a metallic material, is seated on the pilot valve seat 128.

The land 120 of the movable member 20 is radially inwardly smaller in diameter than the main body 118. When the movable member 20 is displaced upwardly, the land 120 is inserted into the recess 116 in the fixing member 104. A resilient member (first resilient member) 130 having a predetermined thickness is mounted on an upper end face of the land 120 which faces the recess 116. The resilient member 130 is made of an elastic material such as rubber or the like, and serves to dampen shocks and eliminate contact noise when the land 120 is inserted into the recess 116 and hits the bottom of the recess 116 upon upward displacement of the movable member 20.

The valve head 34 is made of a metallic material such as stainless steel or the like, and has a substantially crisscross shape. As shown in FIG. 3, the valve head 34 is includes the pilot valve 132 disposed closer to the movable member 20 for being seated on the pilot valve seat 128 on the movable member 20, a main valve (first valve) 134 radially outwardly larger in diameter than the pilot valve 132, for being seated on the valve seat 32 of the valve housing 16, and a guide shaft (guide) 136 displaceably guided by the guide sleeve 46 mounted in the valve housing 16.

The valve head 34 has a pilot passage 138 defined axially therethrough. The pilot valve 132 has the pilot port 140 held in communication with the pilot passage 138. The pilot port 140 has a diameter smaller than the diameter of the pilot passage 138. The diameter of the pilot port 140 is greater than the diameter of the orifice 66 in the auxiliary housing 18.

The pilot valve 132 can be seated on and unseated from the pilot valve seat 128 mounted on the movable member 20. The pilot valve 132 has an upper surface facing the pilot valve seat 128, the upper surface being gradually inclined downwardly in a radially outward direction from its substantially central area.

The valve head 34 has an externally threaded outer circumferential surface 142 between the pilot valve 132 and the main valve 134. The diaphragm 60, which is in the form of a thin membrane, is mounted on the valve head 34. With the diaphragm 60 held against an upper surface of the main valve 134, a nut 146 is threaded over the externally threaded outer circumferential surface 142 with a retainer 144 and a washer 114, fastening a substantially central area of the diaphragm 60 to the valve head 34. The retainer 144 is in the form of a thin plate of a metallic material and has a peripheral edge portion curved upwardly away from the main valve 134.

The diaphragm 60 is made of a resin material. The diaphragm 60 has a skirt 148 flexibly extending radially outwardly from the substantially central area thereof which is fixed to the valve head 34, and the enlarged outer peripheral edge 62 disposed on an outer circumferential portion of the skirt 148. The enlarged outer peripheral edge 62 is placed in the annular recess 58 and clamped between the valve housing 16 and the auxiliary housing 18. The communication chamber 36 is divided by the diaphragm 60 into the first communication chamber 36a defined in the valve housing 16 and the second communication chamber 36b defined in the auxiliary housing 18.

The main valve 134, which is radially outwardly larger in diameter than the pilot valve 132, is disposed in the first communication chamber 36a in the valve housing 16. The main valve 134 has a diameter greater than the outside diameter of the valve seat 32 of the valve housing 16.

The main valve 134 has a lower surface serving as a seating surface 150 that faces the valve seat 32. The seating surface 150 has an annular mount groove 152 of a predetermined depth defined therein. A seat (second resilient member) 154 made of an elastic material such as rubber or the like is mounted in the annular mount groove 152. The main valve 134 also has an annular groove 156 defined therein which extends upwardly from the mount groove 152. The annular groove 156 is filled up with an elastic material joined to the seat 154.

The seat 154 is mounted in a position to contact the valve seat 32 when the main valve 134 is displaced toward the valve seat 32, i.e., in the direction indicated by the arrow b. The seat 154 is mounted in the main valve 134 by filling the mount groove 152 with the elastic material and then curing the elastic material. Since the elastic material introduced into the mount groove 152 flows from the mount groove 152 into the annular groove 156, the seat 154 can easily be integrally molded in the mount groove 152 and the annular groove 156, and hence can be mounted in place easily and efficiently.

The elastic seat 154 has a seating function to close the valve seat 32 when the main valve 134 is seated on the valve seat 32 and a silencing function to prevent contact noise from being produced when the main valve 134 is seated on the valve seat 32 which is made of a metallic material.

A valve spring 158 is interposed between the flat washer 50 mounted in the mount hole 44 in the valve housing 16 and the main valve 134. The valve spring 158 is of a tapered shape which is progressively greater in diameter from an end thereof engaging the main valve 134 toward an opposite end thereof engaging the flat washer 50. The valve spring 158 biases the valve head 34 including the main valve 134 to move in a direction away from the valve seat 32, i.e., in the direction indicated by the arrow a. Specifically, the valve spring 158 has an upper end engaging a corner of the valve head 34 which is defined between the seating surface 150 and the guide shaft 136 and a lower end engaging a corner which is defined between an upper surface of the flat washer 50 and an inner wall surface of the step 48 in the valve housing 16.

The tapered valve spring 158 is effective to radially keep the main valve 134 in axial alignment with the valve seat 32 under the resiliency of the tapered valve spring 158.

The tapered valve spring 158 is spaced a predetermined radial distance from the guide shaft 136 of the valve head 34. Therefore, the guide shaft 136 is kept out of contact with the valve spring 158 when the guide shaft 136 is axially displaced.

The flat washer 50 has an outer circumferential area pressed against the step 48 under the bias of the valve spring 158. Therefore, the flat washer 50 is retained on the step 48 against removal therefrom.

The guide shaft 136 extends by a predetermined length downwardly from the main valve 134. The pilot passage 138 extends axially substantially centrally in the guide shaft 136. The guide shaft 136 has a communication hole 160 defined diametrically therein substantially perpendicularly to the pilot passage 138. The communication hole 160 extends through the outer circumferential surface of the guide shaft 136 and communicates with the pilot passage 138. The guide shaft 136 is inserted through a resin guide hole 162 which is defined axially in the guide sleeve 46, and is axially displaceably guided therein.

Figure 4:
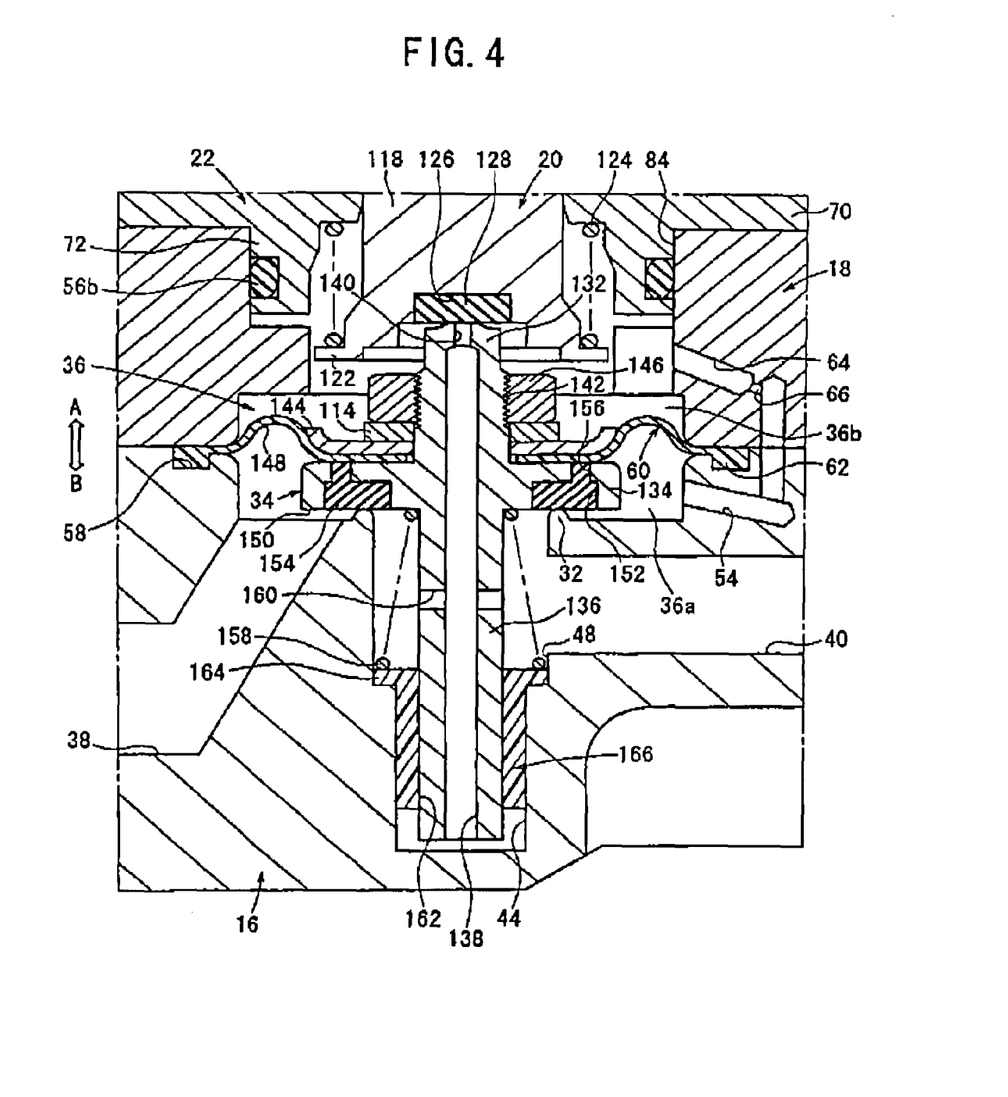
FIG. 4 is an enlarged fragmentary vertical cross-sectional view of the valve head and the surrounding parts including a modified guide sleeve having a flange and mounted in a mount hole defined in a valve housing in the solenoid-operated cutoff valve shown in FIG. 3.

FIG. 4 shows a modified guide sleeve 166 in the form of a hollow cylinder having a flange 164 projecting radially outwardly. The modified guide sleeve 166 is used in place of the guide sleeve 46 and the flat washer 50 which are mounted in the valve housing 16 shown in FIG. 3. The guide sleeve 166 is made of a resin material, and can be lightly press-fitted or fitted in the mount hole 44. The flange 164 engages the step 48 in the mount hole 44.

The lower end of the valve spring 158 is held by the flange 164 of the guide sleeve 166, which is retained in the mount hole 44 under the resilient force of the valve spring 158. With the modified guide sleeve 166, the flat washer 50 shown in FIG. 3 is dispensed with. Therefore, the solenoid-operated cutoff valve with the modified guide sleeve 166 is made up of a reduced number of parts, can be manufactured at a reduced cost, and can be assembled efficiently.

Since the guide sleeve 46 is made of a metallic material, e.g., as a DU bushing, the guide sleeve 46 can be press-fitted into the valve housing 16. Therefore, the guide sleeve 46 thus installed is prevented from being dislodged from the mount hole 44. If the guide sleeve 46 is press-fitted into the valve housing 16, the flat washer 50 and the flange 164 may be dispensed with, and hence the number of parts of the solenoid-operated cutoff valve may be reduced.

The solenoid-operated cutoff valve 10 for use with fuel cells according to the embodiment of the present invention is basically constructed as described above. Operation and advantages of the solenoid-operated cutoff valve 10 will be described below. In FIGS. 2 and 3, the solenoid-operated cutoff valve 10 is in an off state wherein the pilot valve 132 of the valve head 34 is seated on the pilot valve seat 128 and the main valve 134 is seated on the valve seat 32, blocking the fluid flow between the inlet port 12 and the outlet port 14.

In the off state, the fluid is introduced from the inlet port 12 through the first passage 38 into the first communication chamber 36a. At this time, since the fluid flows through the filter 42 mounted in the first passage 38, dust particles and foreign matter contained in the fluid are removed by the filter 42 and prevented from entering the first communication chamber 36a.

A portion of the fluid introduced into the first communication chamber 36a is introduced from the first communication passage 54 through the orifice 66 and the second communication passage 64 into the second communication chamber 36b. Therefore, the fluid introduced from the inlet port 12 into the valve housing 16 is supplied through the first and second communication passages 54, 64 respectively to the first communication chamber 36a and the second communication chamber 36b. The fluid pressure in the first communication chamber 36a and the fluid pressure in the second communication chamber 36b are substantially equal to each other across the diaphragm 60.

When the non-illustrated power supply is turned on to supply an electric current to the coil 100 through the terminal 90 of the connector 88, the coil 100 is energized to generate magnetic fluxes which flow from the coil 100 to the main body 118 of the movable member 20 and then back to the coil 100.

Figure 5:
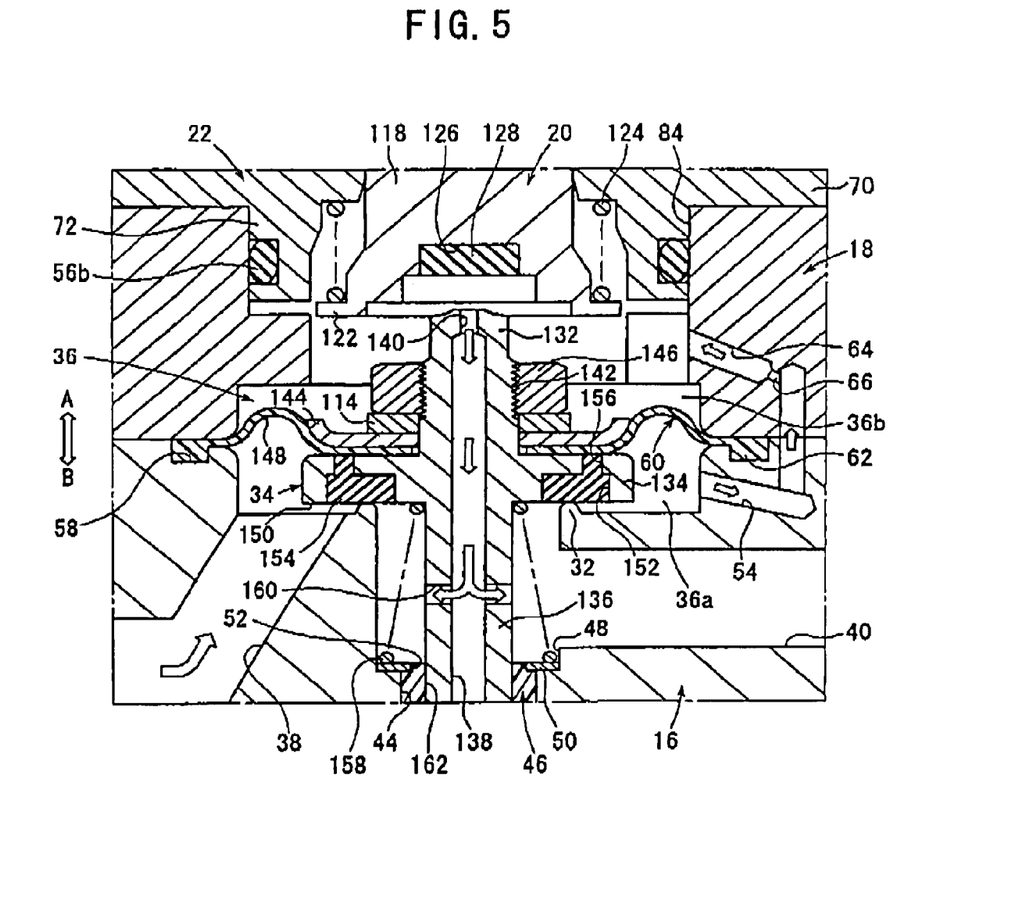
FIG. 5 is an enlarged fragmentary vertical cross-sectional view showing the manner in which a movable member is displaced upwardly with a pilot valve unseated from a pilot valve seat in the solenoid-operated cutoff valve shown in FIG. 3.

As shown in FIG. 5, under the magnetic force, the movable member 20 is now displaced axially upwardly toward the fixing member 104, i.e., in the direction indicated by the arrow a, against the resilient force from the return spring 124, displacing the pilot valve seat 128 off the pilot valve 132. At this time, the main valve 134 of the valve head 34 is seated on the valve seat 32.

The fluid in the second communication chamber 36b flows through the pilot port 140 in the pilot valve 132, the pilot passage 138, and the communication hole 160 into the second passage 40, from which the fluid is discharged out of the solenoid-operated cutoff valve 10 through the outlet port 14. At this time, the fluid pressure in the second communication chamber 36b becomes lower than the fluid pressure in the first communication chamber 36a, developing a pressure difference between the fluid pressure in the second communication chamber 36b and the fluid pressure in the first communication chamber 36a.

Specifically, because the fluid is introduced through the orifice 66 into the second communication chamber 36b, the rate of the fluid flowing out of the second communication chamber 36b through the pilot port 140, which is greater in diameter than the orifice 66, is higher than the rate of the fluid flowing into the second communication chamber 36b through the orifice 66. Therefore, the orifice 66 is effective to progressively lower the fluid pressure in the second communication chamber 36b.

Figure 6:
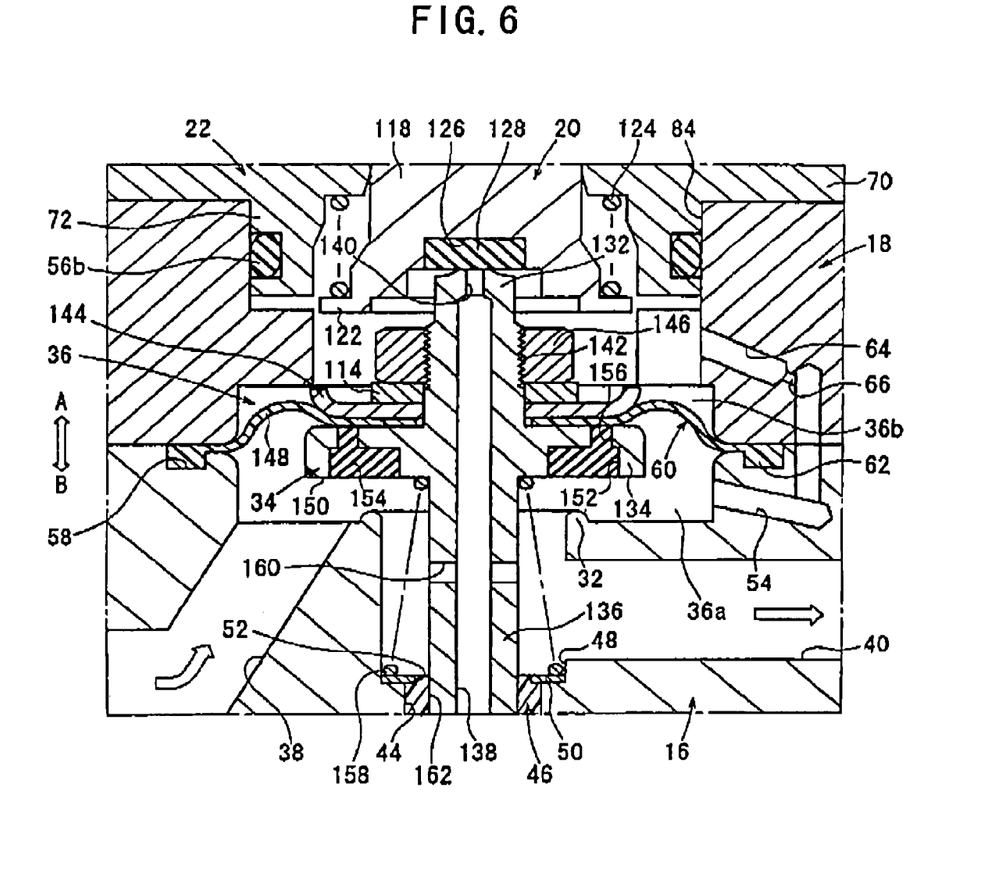
FIG. 6 is an enlarged fragmentary vertical cross-sectional view showing the manner in which the valve head is displaced upwardly with a main valve head thereof being unseated from a valve seat in the solenoid-operated cutoff valve shown in FIG. 5.

As a result, as shown in FIG. 6, a pressing force generated due to the pressure difference between the first communication chamber 36a and the second communication chamber 36b is applied upwardly to the diaphragm 60, i.e., in the direction indicated by the arrow a. In addition the resilient force from the valve spring 158 is applied upwardly to the valve head 34. Consequently, the valve head 34 is displaced toward the movable member 20, unseating the seating surface 150 of the main valve 134 off the valve seat 32.

As a result, the first communication chamber 36a and the outlet port 14 are brought into fluid communication with each other, allowing the fluid introduced from the inlet port 12 into the first communication chamber 36a to flow through the valve seat 32 and the second passage 40 into the outlet port 14.

At this time, a value (W×Gmax) representing the product of the weight w of the movable member 20 and a maximum value Gmax of the vibratory acceleration G on the cutoff valve 10, and the resilient force Pr of the return spring 124 are canceled by the electromagnetic force generated by the solenoid 28. The sum of the pressing force Pd applied to the diaphragm 60 under the pressure difference between the first communication chamber 36a and the second communication chamber 36b and the resilient force Ps of the valve spring 158 is set to a value greater than the product of the weight w and the maximum value Gmax of the vibratory acceleration G on the main valve 134 ((W×Gmax)<Pd+Ps).

When the main valve 134 is unseated from the valve seat 32, the sum of the pressing force pd applied to the diaphragm 60 under the pressure difference between the first communication chamber 36a and the second communication chamber 36b and the resilient force Ps of the valve spring 158 overcomes the value (W×Gmax), keeping the main valve 134 open.

Conversely, when the main valve 134 is seated on the valve seat 32, the resilient force Pr of the return spring 124 overcomes the pressing force pd applied to the diaphragm 60 under the pressure difference between the first communication chamber 36a and the second communication chamber 36b and the resilient force Ps of the valve spring 158, keeping the main valve 134 desirably closed. In addition, the value (W×Gmax) representing the product of the weight W of the movable member 20 and the main valve 134 and the maximum value Gmax of the vibratory acceleration G on the cutoff valve 10 is applied to keep the valve head 34 reliably open or closed even when the cutoff valve 10 is vibrated with the maximum value Gmax of the vibratory acceleration g, and also to allow the valve head 34 to be displaced freely.

For preventing the fluid from flowing through the solenoid-operated cutoff valve 10 in this on state, the electric current supplied from the non-illustrated power supply to the coil 100 is interrupted to de-energize the coil 100, eliminating the force tending to displace the main body 118 of the movable member 20 toward the fixing member 104. Therefore, the movable member 20 is pressed toward the valve seat 32, i.e., in the direction indicated by the arrow b, under the resilient force of the return spring 124, until the pilot valve seat 128 on the movable member 20 is seated on the pilot valve 132 of the valve head 34.

The fluid flowing through the pilot passage 138 from the second communication chamber 36b into the outlet port 14 is now blocked, whereupon the pressure difference between the first communication chamber 36a and the second communication chamber 36b is eliminated. The seating surface 150 of the main valve 134 of the valve head 34 is now seated on the valve seat 32 of the valve housing 16. The solenoid-operated cutoff valve 10 is brought into the off state wherein the communication chamber 36 and the outlet port 14 are held out of fluid communication with each other. The fluid introduced from the inlet port 12 now stops being discharged out from the outlet port 14.

With the cutoff valve 10 according to the present embodiment, as described above, the flexible diaphragm 60 is mounted in place between the main valve 134 of the valve head 34 and the pilot valve 132, and the enlarged outer peripheral edge 62 of the diaphragm 60 is clamped between the valve housing 16 and the auxiliary housing 18. The communication chamber 36 defined in the valve housing 16 and the auxiliary housing 18 is divided by the diaphragm 60 into the first communication chamber 36a defined in the valve housing 16 and the second communication chamber 36b defined in the auxiliary housing 18.

When the movable member 20 is displaced upwardly upon energization of the solenoid 28, the fluid introduced into the first communication chamber 36a flows through the first and second communication passages 54, 64 into the second communication chamber 36b. As the pilot valve 132 is unseated from the pilot valve seat 128, the fluid flows through the pilot passage 138 into the outlet port 14. As a result, the fluid pressure in the second communication chamber 36b becomes lower than the fluid pressure in the first communication chamber 36a, applying an upward pressing force to the diaphragm 60 under the pressure difference between the first communication chamber 36a and the second communication chamber 36b, causing the diaphragm 60 to lift the valve head 34 off the valve seat 32.

Therefore, the valve head 34 can reliably and quickly be displaced under the pressure difference between the first communication chamber 36a and the second communication chamber 36b without being affected by the fluid pressures in upstream and downstream regions of the fluid passage (not shown) to which the cutoff valve 10 is connected. The response of the cutoff valve 10 for seating the valve head 34 on the valve seat 32 and unseating the valve head 34 from the valve seat 32 is thus made higher than the response of conventional cutoff valves.

The diameter of the pilot port 140 in the pilot valve 132 is greater than the diameter of the orifice 66 in the auxiliary housing 18, so that the rate of the fluid flowing from the pilot port 140 into the outlet port 14 is greater than the rate of the fluid flowing through the orifice 66 into the second communication chamber 36b. The fluid pressure in the second communication chamber 36b is thus made lower than the fluid pressure in the first communication chamber 36a, making it possible to increase the pressure difference between the first communication chamber 36a and the second communication chamber 36b.

Furthermore, since the valve spring 158 is disposed between the seating surface 150 of the main valve 134 and the flat washer 50 mounted on the valve housing 16 in facing relation to the outlet port 14, the communication chamber 36 may be smaller in size than if the spring is disposed in the communication chamber 36. As the resilient force of the valve spring 158 is applied in a direction to press the valve head 34 toward the movable member 20, the valve head 34 can follow the displacement of the movable member 20. As a result, the communication chamber 36 may be reduced in size, allowing the fluid to be quickly introduced into and discharged from the communication chamber 36, and the valve head 34 can be displaced axially with an increased response.

The guide sleeve 46 in the form of a hollow cylinder is disposed in the mount hole 44 in the valve housing 16, and the guide shaft 136 of the valve head 34 extends through the guide hole 162 in the guide sleeve 46. The valve head 34 is axially displaceably guided by the guide shaft 136, so that the main valve 134 of the valve head 34 is prevented from being tilted and shifted radially. Therefore, the main valve 134 can stably and accurately be seated on the valve seat 32, and the pilot valve 132 can stably and accurately be seated on the pilot valve seat 128.

Inasmuch as the guide sleeve 46 is made of fluorine resin, e.g., Teflon®, the guide shaft 136 can displaceably be guided along the guide hole 162 in the guide sleeve 46 smoothly.

The flat washer 50 is mounted on the upper end of the guide sleeve 46 and the step 48 in the valve housing 16. The flat washer 50 is effective to prevent the guide sleeve 46 lightly press-fitted or fitted in the mount hole 44 from being dislodged out of the mount hole 44.

Although certain preferred embodiments of the present invention have been shown and described in detail, it should be understood that various changes and modifications may be made therein without departing from the scope of the appended claims.

What is claimed is:

1. A solenoid-operated cutoff valve for selectively blocking the supply of a reaction gas to fuel cells, comprising:
   a main housing having an inlet port defined therein for introducing said reaction gas, an outlet port defined therein for discharging the reaction gas introduced from said inlet port, and a communication chamber defined therein and interconnecting said inlet port and said outlet port;
   a solenoid disposed in a solenoid housing connected to said main housing, for being energized by an electric current supplied thereto;
   a movable member disposed in confronting relation to a fixing member disposed in said solenoid, for axial displacement upon energization of said solenoid;
   a valve head having a first valve being sealable on and away from a first valve seat mounted on said movable member and a second valve being seatable on and away from a second valve seat on said main housing;
   a flexible member disposed in said communication chamber and connected to said valve head, said flexible member being flexible upon displacement of said valve head, said flexible member dividing said communication chamber into a first communication chamber and a second communication chamber; and
   a communication passage defined in said main housing and providing fluid communication between said first communication chamber and said second communication chamber, said communication passage including a restriction for reducing the rate of the reaction gas flowing through said communication passage;
   a removing member disposed in said inlet port for removing dust particles contained in said reaction gas, said removing member including a plurality of fine pores having a pore size smaller than a diameter of a passage defined in said restriction;
   a first spring disposed between said second valve and an engaging member disposed in said main housing for biasing said second valve to move in a direction away from said second valve seat; and
   a second spring disposed between said movable member and said solenoid for biasing said movable member to move in a direction away from said fixing member by resilient force,
   wherein said valve head has a guide extending from said second valve in a direction away from said first valve, said guide is axially displaceably guided in said main housing, and
   wherein said main housing has a hollow cylindrical guide sleeve, said guide being axially displaceably held by said hollow cylindrical guide sleeve, said hollow cylindrical guide sleeve being axially engaged by an engaging member mounted in said main housing.

2. A solenoid-operated cutoff valve according to claim 1, wherein said restriction is disposed in a position spaced from said inlet port in said main housing.

3. A solenoid-operated cutoff valve according to claim 1, wherein said main housing comprises a first housing and a second housing, said flexible member having an outer peripheral edge clamped between said first housing and said second housing, said solenoid-operated cutoff valve further comprising a seal disposed between said first housing and said second housing radially outwardly of said outer peripheral edge clamped between said first housing and said second housing.

4. A solenoid-operated cutoff valve according to claim 3, wherein said communication passage is defined in said main housing between said outer peripheral edge and said seal.

5. A solenoid-operated cutoff valve according to claim 1, further comprising a first resilient member mounted on said movable member and positioned between said movable member and said fixing member.

6. A solenoid-operated cutoff valve according to claim 1, wherein said first valve seat is made of an elastic material.

7. A solenoid-operated cutoff valve according to claim 1, wherein said second valve has a second resilient member mode of an elastic material on an end face thereof which is seatable on said second valve seat.

8. A solenoid-operated cutoff valve according to claim 1, wherein said guide is made of fluorine resin, and is fitted in a mount hole defined in said main housing.

9. A solenoid-operated cutoff valve according to claim 1, wherein said first valve is disposed on a side of said flexible member closer to said movable member, and said second valve is disposed on an opposite side of said flexible member closer to said main housing.

10. A solenoid-operated cutoff valve for selectively blocking the supply of a reaction gas to fuel cells, comprising:
   a main housing having an inlet port defined therein for introducing said reaction gas, an outlet port defined therein for discharging the reaction gas introduced from said inlet port, and a communication chamber defined therein and interconnecting said inlet port and said outlet port;
   a solenoid disposed in a solenoid housing connected to said main housing, for being energized by an electric current supplied thereto;
   a movable member disposed in confronting relation to a fixing member disposed in said solenoid, for axial displacement upon energization of said solenoid;
   a valve head having a first valve being seatable on and away from a first valve seat mounted on said movable member and a second valve being seatable on and away from a second valve seat on said main housing;
   a flexible member disposed in said communication chamber and connected to said valve head, said flexible member being flexible upon displacement of said valve head, said flexible member dividing said communication chamber into a first communication chamber and a second communication chamber;
   a communication passage defined in said main housing and providing fluid communication between said first communication chamber and said second communication chamber, said communication passage including a restriction for reducing the rate of the reaction gas flowing through said communication passage;
   a removing member disposed in said inlet port for removing dust particles contained in said reaction gas, said removing member with a plurality of fine pores having a pore size smaller than a diameter of a passage defined in said restriction;
   a first spring disposed between said second valve and said main housing near said outlet port for biasing said second valve to move in a direction away from said second valve seat; and
   a second spring disposed between said movable member and said solenoid for biasing said movable member to move in a direction away from said fixing member by resilient force,
   wherein said valve head has a guide extending from said second valve in a direction away from said first valve, said guide is axially displaceably guided in said main housing,
   wherein said main housing has a hollow cylindrical guide sleeve made of a resin material, said guide being axially displaceably held by said hollow cylindrical guide sleeve, said guide having a flange disposed on an end thereof facing said second valve and projecting radially outwardly.

11. A solenoid-operated cutoff valve for selectively blocking the supply of a reaction gas to fuel cells, comprising:
   a main housing having an inlet port defined therein for introducing said reaction gas, an outlet port defined therein for discharging the reaction gas introduced from said inlet port, and a communication chamber defined therein and interconnecting said inlet port and said outlet port;
   a solenoid disposed in a solenoid housing connected to said main housing, for being energized by an electric current supplied thereto;
   a movable member disposed in confronting relation to a fixing member disposed in said solenoid, for axial displacement upon energization of said solenoid;
   a valve head having a first valve being seatable on and away from a first valve seat mounted on said movable member and a second valve being seatable on and away from a second valve seat on said main housing;
   a flexible member disposed in said communication chamber and connected to said valve head, said flexible member being flexible upon displacement of said valve head, said flexible member dividing said communication chamber into a first communication chamber and a second communication chamber;
   a communication passage defined in said main housing and providing fluid communication between said first communication chamber and said second communication chamber, said communication passage including a restriction for reducing the rate of the reaction gas flowing through said communication passage;
   a removing member disposed in said inlet port for removing dust particles contained in said reaction gas, said removing member with a plurality of flue pares having a pore size smaller than a diameter of a passage defined in said restriction;
   a first spring disposed between said second valve and said main housing near said outlet port for biasing said second valve to move in a direction away from said second valve seat; and
   a second spring disposed between said movable member and said solenoid for biasing said movable member to move in a direction away from said fixing member by resilient force,
   wherein said valve head has a guide extending from said second valve in a direction away from said first valve, said guide is axially displaceably guided in said main housing,
   wherein said main housing has a hollow cylindrical guide sleeve made of a metallic material, said guide being axially displaceably held by said hollow cylindrical guide sleeve, said hollow cylindrical guide sleeve being press-fitted into said main housing.

* * * * *